(12) United States Patent
Tankersley

(10) Patent No.: US 6,966,105 B2
(45) Date of Patent: Nov. 22, 2005

(54) PROCESS FOR RECLAIMING RUBBER-METAL WASTE

(76) Inventor: Jay C. Tankersley, 7575 Pegasus Rd., Temple, TX (US) 76501

( * ) Notice: Subject to any disclaimer, the term of this patent is extended or adjusted under 35 U.S.C. 154(b) by 153 days.

(21) Appl. No.: 10/707,568

(22) Filed: Dec. 22, 2003

(65) Prior Publication Data
US 2005/0132553 A1 Jun. 23, 2005

(51) Int. Cl.[7] .................................. B23P 19/04
(52) U.S. Cl. ................ 29/403.4; 29/403.3; 521/40; 264/36.1; 264/80
(58) Field of Search ............... 29/403.4, 403.3, 29/426.1; 521/40; 264/36.1, 80

(56) References Cited

U.S. PATENT DOCUMENTS

| | | | |
|---|---|---|---|
| 1,956,519 A | * | 4/1934 | Thomson ................... 432/226 |
| 3,670,969 A | | 6/1972 | Terada |
| 3,963,417 A | * | 6/1976 | Placek ...................... 432/225 |
| 4,342,647 A | | 8/1982 | McMillan et al. |
| 4,469,817 A | * | 9/1984 | Hayashi et al. ............... 521/45 |
| 5,095,040 A | * | 3/1992 | Ledford .................... 521/40.5 |
| 5,234,171 A | | 8/1993 | Fantacci |
| 5,290,380 A | | 3/1994 | Gitelman et al. |
| 5,500,072 A | * | 3/1996 | Fujimura et al. ........... 156/344 |
| 5,505,008 A | * | 4/1996 | Hugo et al. .................. 34/403 |
| 5,683,038 A | | 11/1997 | Shinal |

* cited by examiner

Primary Examiner—David P. Bryant
Assistant Examiner—Stephen Kenny

(57) ABSTRACT

For a workpiece having a metal part bonded to a rubber part, a method is devised to separate the metal and rubber parts. A flame is used to heat a portion of an exposed surface of the metal part, while moving the flame relative to the metal part until substantially all the exposed metal surface is heated. The process is repeated until the metal and rubber parts separate.

5 Claims, 2 Drawing Sheets ns
PROCESS FOR RECLAIMING RUBBER-METAL WASTE

BACKGROUND OF INVENTION

This invention relates in general to processes for reclaiming rubber-to-metal bonded material. In particular, the invention relates to a process for using flame heat to remove rubber from parts where the rubber is bonded to a metal component while leaving the metal component in a reusable state, and preferably with the rubber component substantially unaltered.

When rubber is bonded to metal through any of various conventional methods, the resulting bond often will not release, even when the rubber undergoes tearing or splitting. Thus, if a part is rejected after the bonding process, the whole part is often discarded. This is undesirable since the metal components are usually more costly to prepare than the rubber parts. Also, the rubber portion of the part often wears out while the metal portion is still perfectly usable. In either case, the expensive metal part is simply discarded along the rubber.

There are numerous methods known for recycling structures having bonded rubber and metal parts that separate the rubber from the metal. The methods vary widely in principle, from grinding and destructive heating to cryogenic freezing and chemical disintegration. In every case, either the metal or rubber component (or both) are dramatically affected.

U.S. Pat. No. 3,670,969, issued to Terada on Jun. 20, 1972, discloses a method of removing insulation from electrical wiring by chopping the wire into short sections, then dumping the pieces into a liquid-filled tank. The liquid with the cut up pieces is stirred by a special agitator designs to knock or chop the softer insulation off the wire. The specific gravity of the liquid is chosen so that the insulation knocked off the wire will float to the top of the liquid, while the wire will sink.

U.S. Pat. No. 4,342,647, issued to McMillan et al. on Aug. 3, 1982, teaches the removal of rubber from metal parts by bathing the parts in cryogenic liquid, during which the rubber becomes sufficiently embrittled that it can simply be removed by hammer milling. The rubber's properties undergo dramatic change as a result of cryogenic freezing. Also, the equipment required for handling the cryogenic liquid is relatively expensive and complex.

U.S. Pat. No. 5,234,171, issued to Fantacci on Aug. 10, 1993, discloses a method of grinding up vehicle tires and the like, whereupon the metal and rubber are separated by conventional magnetic separation and air classification. Obviously, the metal pieces are no longer in their original form and must be smelted down and recast or forged before being used again.

Finally, U.S. Pat. No. 5,505,008, issued to Hugo et al. on Apr. 9, 1996, discloses removal of organic materials from metal by subjecting the organic material to heat in a non-reactive atmosphere (to avoid combustion) for long enough that the organic material becomes brittle and either falls off or can easily be physically removed. While the metal workpiece is not significantly affected, the rubber piece will be destroyed.

None of the previously methods can satisfactorily reclaim workpieces made of rubber and metal bonded together, because they require physical or chemical destruction of either the metal or rubber portions, or both. A need remains for a method of separating bonded metal-rubber parts such as metal insert O-rings while leaving both the metal and the rubber portions in reusable form.

SUMMARY OF INVENTION

In general, the desired features and advantages of the invention are achieved on a workpiece made of metal and rubber parts bonded together by heating a portion of the metal part with a flame, while slowly traversing the flame relative to the workpiece, cyclically across the entire metal part, so that a particular location on the metal is alternately heated by the flame for a short period, followed by a longer cooling period. This heating/cooling process is repeated for a predetermined period. The thermal cycling of the metal insert causes repeated expansion and contraction of the localized area of the insert, which ultimately result in physically breaking the bond between the metal insert and the rubber O-ring. The flame can be moved about a stationary workpiece, or preferably the workpiece can be placed on a turntable, which turns the workpiece relative to a stationary flame. Preferably, the metal part is exposed to the post-combustion gases from the flame, rather than having the flame directly contact the metal. The flame's traversal rate and the total heating time will vary depending on the size and type of metal, as will the peak bulk temperature of the metal part.

The method has the advantage that the rubber O-ring is not dramatically affected by the heating of the metal insert. While the O-ring does experience some shrinkage in the channel area, the O-ring is not burned and retains its annular shape and enough of its elasticity that it can be reused in other applications, or ground up to made new rubber parts. Also, the metal insert is unaffected by the relatively gentle heating and can be used to bond to another rubber part.

Additional features and advantages of the invention will become apparent in the following detailed description and in the drawings.

DETAILED DESCRIPTION

In the following discussion, elements having the same function that are depicted in more than one drawing are given the same reference number. Also, the drawn are not necessarily drawn to scale, and in some figures proportions may be exaggerated for clarity.

Figure 1:
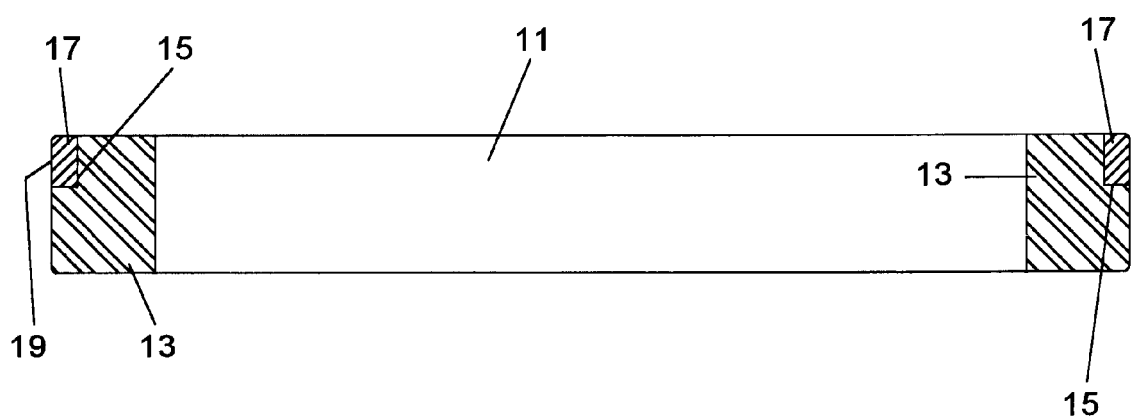
FIG. 1 is a cross-sectional view of a typical workpiece, having a metal retaining ring bonded to a surrounding rubber O-ring.

FIG. 1 shows a typical workpiece 11 on which the method of the invention is carried out. The workpiece 11 comprises a rubber O-ring 13 about 6.3 centimeters (2.5 inches) in diameter having a channel 15 designed to receive a mating metal insert 17 about three millimeters high by one and a half millimeters wide. The metal insert 17 must have an exposed surface 19 in order to carry out the method of the invention.

Figure 2:
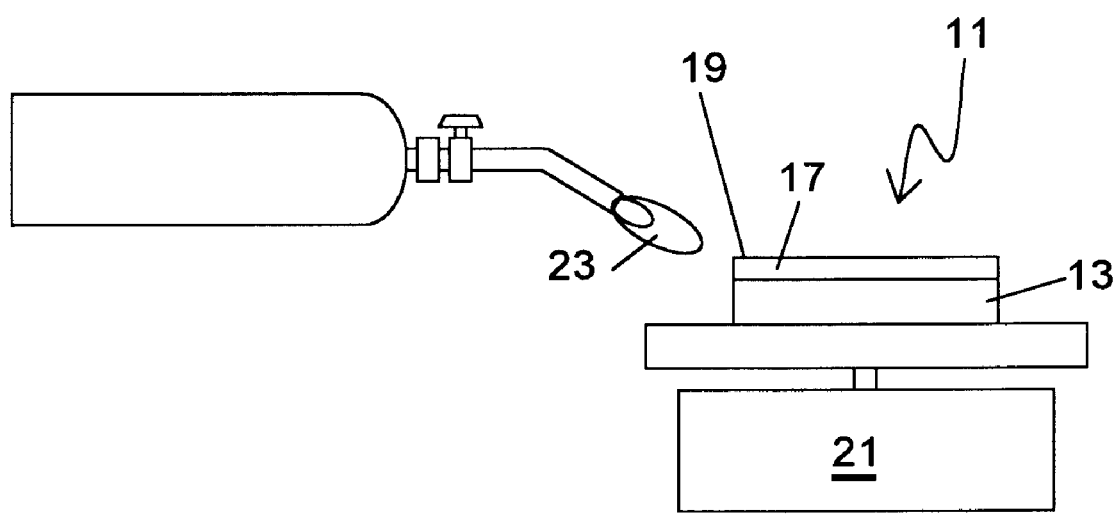
FIG. 2 is a front plan view of the method of the invention being carried out on the workpiece.

As shown in FIG. 2, the workpiece is placed on a turntable 21, which turns the workpiece 11 at a predetermined rate. A spindle having a graduated diameter (similar to a jeweler's tool for finding ring size) can also be used to process annular parts having different inner diameters. A controlled flame 23 is brought into proximity with the workpiece 11 so that the post-combustion gases from the flame contact the metal insert's exposed surface 19. While a hand-held torch is shown for providing the flame, any equipment can be used for providing either a stationary or moving flame, as required. Direct contact of the metal insert 17 with the flame 21 is not preferred as this increases the chance that the rubber O-ring 13 will be burned, but direct contact is not prohibited. The workpiece is turned at a rate dependent on the size of the metal and the type of metal. The turning rate will be inversely proportional to the metal's total mass and heat capacity coefficient, and directly proportional to the thermal conductivity and thermal expansion coefficients. Metals such as aluminum will require faster turning than metals such as steel. For the workpiece shown in the figures, a turning rate of about twenty to sixty revolutions per minute has been shown to be effective.

As previously discussed, each spot on the exposed surface 19 is repeatedly subjected to a short period of heating, followed by a relatively longer cooling period. The effect of this repeated heating is that the metal insert will expand and contract repeatedly, which eventually breaks the bond between the metal insert 17 and the rubber O-ring 13. The time required to separate the metal from the rubber part will vary with the size of the workpiece and the composition of the metal, in a manner similar to that just described for the turning rate. For the depicted workpiece, a typical separation time is about thirty seconds.

Although each particular location on the exposed surface 19 is heated only a fraction of the total time, the bulk temperature of the metal part 15 will rise over time. The bulk temperature is typically between about 200° F. to 900° F. (93.3° C. to 482.2° C.). The temperature can be used as one parameter for setting up automatic control of the process.

For workpieces where the metal part is completely encased inside the rubber, the method just described cannot be used directly. However, if the thickness of the rubber covering the metal is less than about six millimeters (¼ inches), an additional step can be used to "blow off" the rubber to create an exposed metal surface for processing using the method of the invention. To remove the rubber, a super-oxygenated flame under high pressure using a mixture of oxygen at about 120 psig (827 kPa) and propane at about 10 psig (69 kPa) in a conventional burner jet to "blast" the rubber off the metal part, leaving a workpiece with an exposed metal surface that can be treated as previously described.

The invention has several advantages over the prior art. The method can separate bonded rubber and metal articles without significant damage to either the metal or the rubber parts. The method is relatively fast, and can be easily automated. It requires no expensive, corrosive chemicals or cryogenic liquids and produces minimal pollutants. It consumes less energy per piece reclaimed than most conventional methods.

The invention has been shown in one embodiment. It should be apparent to those skilled in the art that the invention is not limited to the embodiment, but is capable of being varied and modified without departing from the scope of the invention as set out in the attached claims.

What is claimed is:

1. A process for recycling a workpiece having a rubber part and a metal part bonded together with the metal part having a surface exposed to the environment, comprising the steps of: A) heating a portion of the exposed metal surface using a flame; and B) while heating the metal in step (A), moving the flame relative to the exposed metal surface steadily so that substantially the entire exposed metal surface is heated by the flame; and C) continuing steps (A) and (B) to raise the bulk temperature of the metal piece until the rubber piece separates from the metal piece.

2. A process as recited in claim 1, wherein the post-combustion product of the flame contacts the metal piece.

3. A process as recited in claim 1, wherein the flame moves at a rate relative to the exposed metal surface at a rate of between about twenty and sixty cycles per minute.

4. A process as recited in claim 1, wherein the metal piece is heated to a bulk temperature ranging from about 200° F. to about 900° F. (93.3° C. to 482.2° C.).

5. A process as recited in claim 1, wherein the flame is stationary and the workpiece is moved.

* * * * *